3 Sheets—Sheet 1.

J. R. ROGERS.

Assignor, by mesne assignments, to THE ROGERS TYPOGRAPH COMPANY.

MACHINE FOR MAKING STEREOTYPE MATRICES.

No. 11,198. Reissued Oct. 13, 1891.

Witnesses
N. H. Fay
J. B. Fay

Inventor
J. R. Rogers
By his Attorney
Thos B. Hall

THE NORRIS PETERS CO., PHOTO-LITHO., WASHINGTON, D. C.

3 Sheets—Sheet 2.

J. R. ROGERS.

Assignor, by mesne assignments, to THE ROGERS TYPOGRAPH COMPANY.

MACHINE FOR MAKING STEREOTYPE MATRICES.

No. 11,198. Reissued Oct. 13, 1891.

Witnesses
N. A. Fay
J. D. Fay

Inventor
J. R. Rogers
By his Attorney
Thos B. Hall

THE NORRIS PETERS CO. PHOTO-LITHO., WASHINGTON, D. C.

3 Sheets—Sheet 3.
J. R. ROGERS.
Assignor, by mesne assignments, to THE ROGERS TYPOGRAPH COMPANY.
MACHINE FOR MAKING STEREOTYPE MATRICES.
No. 11,198. Reissued Oct. 13, 1891.
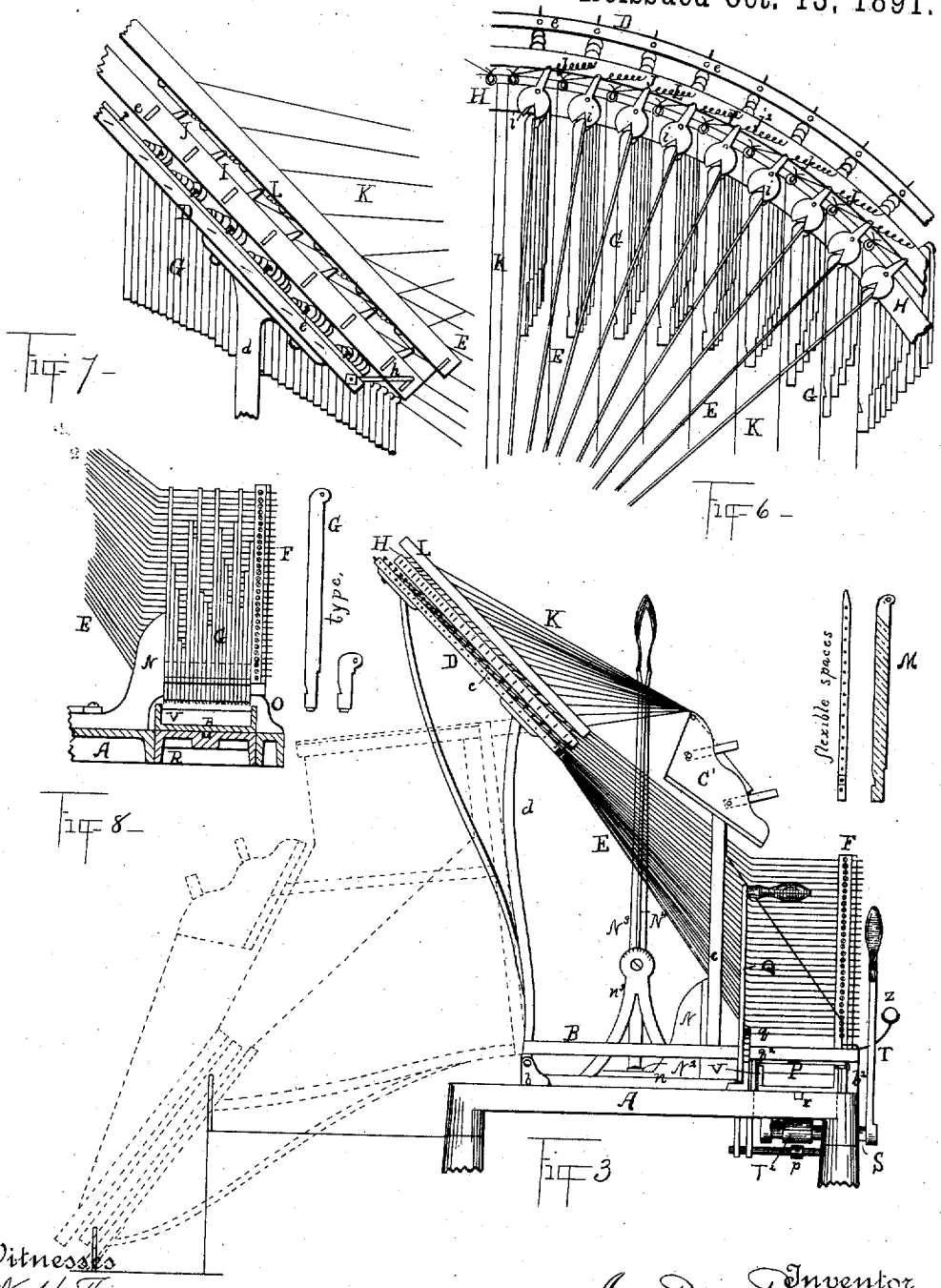
Witnesses
N. H. Fay
J. B. Fay
Inventor
J. R. Rogers
By his Attorney
Thos B Hall.
THE NORRIS PETERS CO., PHOTO-LITHO., WASHINGTON, D. C.

UNITED STATES PATENT OFFICE.

JOHN R. ROGERS, OF CLEVELAND, OHIO, ASSIGNOR, BY MESNE ASSIGNMENTS, TO THE ROGERS TYPOGRAPH COMPANY, OF NEW JERSEY.

MACHINE FOR MAKING STEREOTYPE-MATRICES.

SPECIFICATION forming part of Reissued Letters Patent No. 11,198, dated October 13, 1891.

Original No. 389,108, dated September 4, 1888. Application for reissue filed March 26, 1889. Serial No. 304,918.

*To all whom it may concern:*

Be it known that I, JOHN R. ROGERS, a citizen of the United States, residing at Lorain, in the county of Lorain and State of Ohio, at the time of making the application for the patent of which this is a reissue application, but now residing at Cleveland, county of Cuyahoga, and State of Ohio, have invented a new and useful Machine for Making Stereotype-Matrices, of which the following is a specification.

This invention relates to a machine for making stereotype-matrices; and it consists of the several novel features of construction and new combinations of parts hereinafter fully described, and then definitely pointed out in the claims.

The invention is embodied in the mechanism illustrated in the accompanying drawings, in which—

Figure 1:
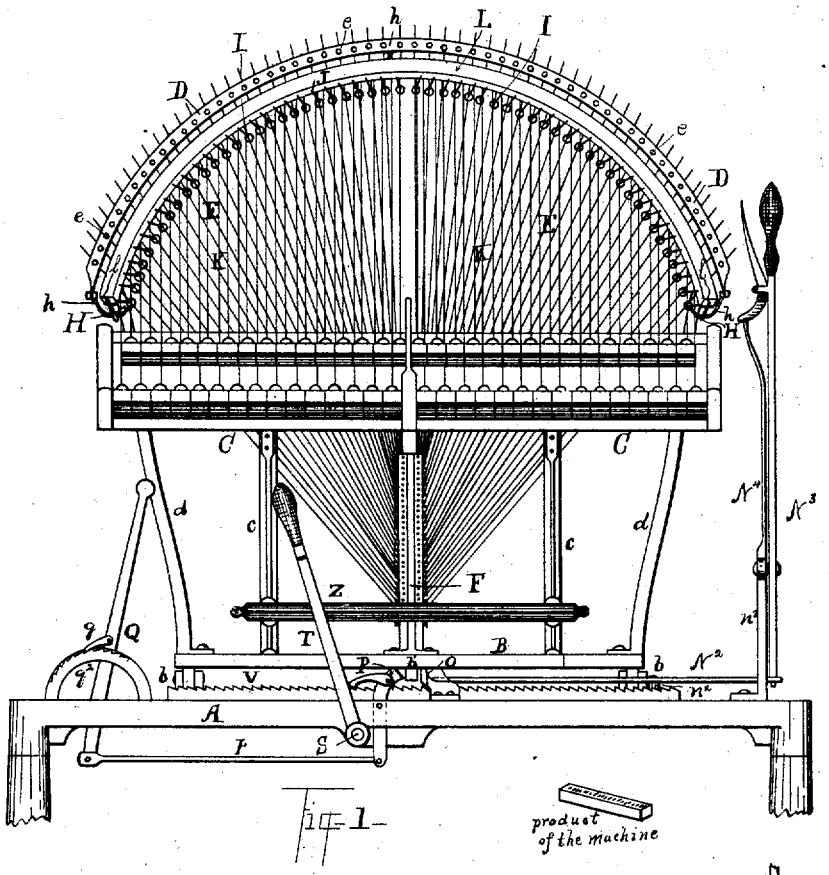
Figure 5:
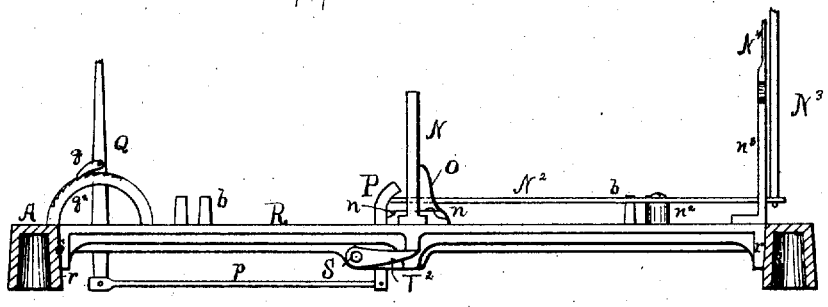
Figure 2:
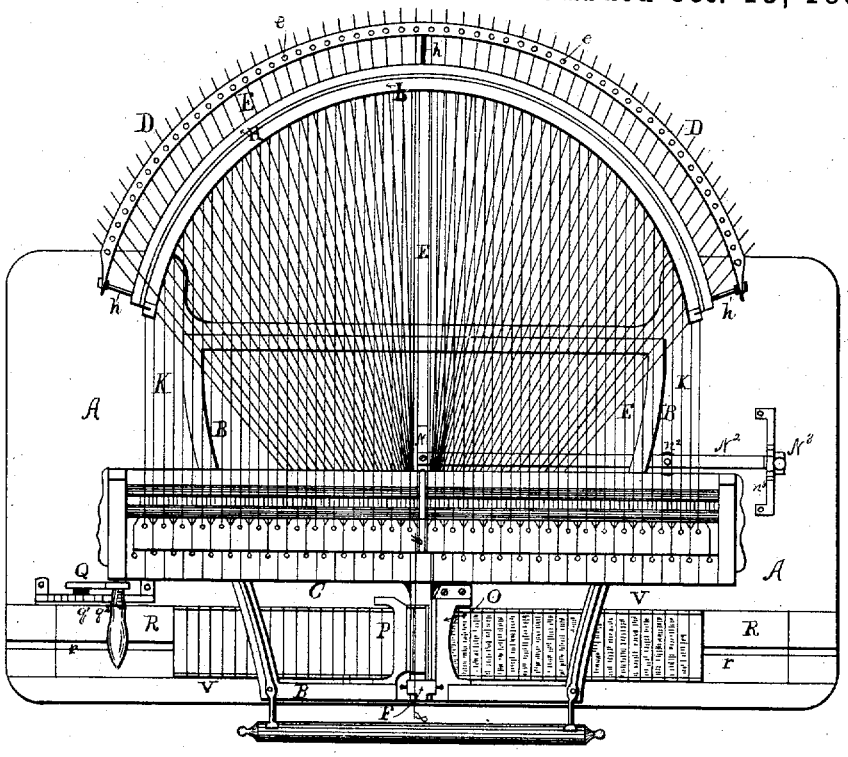
Figure 4:
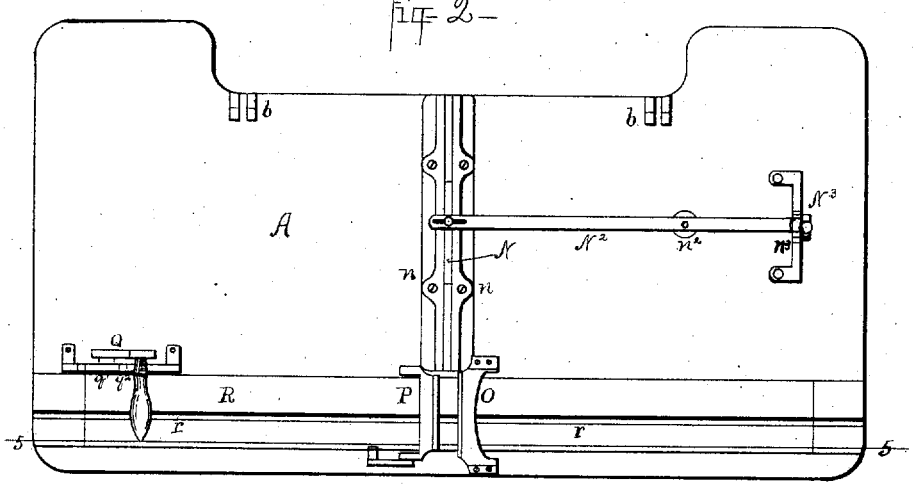

Figure 1 is a front elevation of my machine. Fig. 2 is a top or plan view, and Fig. 3 is an end view, of the same. Fig. 4 is a top view of the bed or table upon which the machine stands, showing the justifying and the gripping mechanism. Fig. 5 is a longitudinal and vertical section through said table in line 5 5 on Fig. 4. Fig. 6 is a detached and enlarged view of a portion of the arch supporting the upper ends of a series of wires upon which the types are strung, showing the types hanging suspended under the arch and the latch mechanism by which the types are held and individually released for assembling them. Fig. 7 is a side view of the same. Fig. 8 is a vertical section of a group of assembled types on line 8 8 through Fig. 2, showing the types gripped and in position for making the impression.

Similar letters refer to similar parts throughout the several views.

A is the bed or table supporting all the working parts of the machine, and it may be supported on suitable legs or frame, which may be portable or not, as may be desirable.

B is a frame supported a little above the table, and is pivoted at the two rear corners to ears or lugs *b b* at the rear side of the table, by means of which said frame and its accompanying parts may be tilted over backward, as shown in dotted lines, Fig. 3, for a purpose hereinafter described.

C is a key-board, supported at a convenient height by posts *c c*, standing on the said frame B, the keys being arranged in two banks for convenience and compactness. These keys resemble those of a piano or organ; but they may be modified from this arrangement, if desired.

D is an arc or segment of a circle forming a bow, supported upon posts *d d*, also standing on the frame B. It is located on a higher level and back of the said key-board and on a plane about forty-five degrees to the horizontal plane of the table A.

E is a series of wires adjustably secured in the said arc or bow by means of set-screws *e*. Said wires extend forward and downward from said arc or bow, and are concentrated into two vertical planes near together, and are each bent to bring their ends on a horizontal plane parallel to that of the table beneath and forward of the key-board. The forward ends of said wires E are adjustably secured in a post F, standing on the middle of the front bar of the frame B. Beneath the frame B is attached a foot *b'*, which supports the front of frame B. Upon the said wires E are strung types G, which are preferably made of steel or are steel face, each wire supporting the types of a single letter. Said types are made in varying lengths to correspond with the height of the lower ends of their respective wires above the table, the object of which will hereinafter appear. These wires form tramways on which the types are made to travel for the purpose of assembling them in the composition of words and sentences. The wires are sufficient in number to contain full alphabets of both upper and lower case types, together with all the punctuation-marks, figures, and with spaces, each wire holding a number of types of one sort, the types together constituting a small font capable of setting up any ordinary line of reading-matter, the design of my machine being to set up one line at a time, to justify the line, take the impression therefrom to make a matrix, and then distribute said line, and repeat this operation, whereby a column of single-line matrices is produced in a galley, ready for casting a stereotype-plate, either in full column or paragraphs.

The mechanism for assembling the aforesaid types, justifying, taking the impression therefrom, and again distributing them is described as follows: Just above and in front of arc or bow D is located a second arc or bow H, supported by arms *h* at the ends and middle of the bow, said arms being fixed in slots in said bow H, for adjustment and another purpose, hereinafter shown. To the arc or bow H are fixed latches I, designed for use in releasing one type at a time in the operation of assembling said types. These latches consist of plates pivoted to the bow and having a slot *i*, forming lips bent so as to bring one lip forward of the other, the forward lip serving as a stop to hold a type from sliding down the wire except whenever the latch is turned, and then the forward lip releases but one type at a time, because when the latch is turned it brings the rear lip in front of the second type and holds it with the others behind it, thereby releasing only the first one, which slides down its wire by its own gravity to the place of assembly. The said latches are operated from the key-board in the manner and by the means as follows: Each of said latch-plates is provided with an arm or lever J, connected by a cord K, passing over a pulley *j* on bow H and rollers $K^2$ on key-board C, with a corresponding key. A third arc or bow L is provided above the said arc or bow H, and is secured thereto by arms *l* at the ends and middle. To this arc or bow L are attached small pulleys *j*, through which the cords K pass, connecting the said latches with the keys. A spring $j^2$ is attached to the end of each of said levers and connected with the bow L, the tension of which draws the latches over and holds them in their normal position. The types and their latches are arranged in order on each side of the middle of said arcs or bows to accommodate the assembling of the types on the two perpendicular rows of wires at the front. At the middle part of the arc on the middle wire for convenience may be arranged the spaces for dividing words in a line, which space consists of a shank of rubber provided with a hook or eye, on which it is suspended upon the wires. The rubber shank is obliquely perforated, which will allow it to be more easily compressed.

The justifying mechanism consists as follows: Across the bed or table are fixed ways *n n*, in which is placed a sliding jaw N, which is operated by means of a lever $N^2$, fulcrumed to a short post or block $n^2$ on the table A, and this lever $N^2$ is connected to a perpendicular lever $N^3$, fulcrumed to a post $n^3$ on the table A. Said lever $N^3$ is provided with a latch-lever and rod $N^4$, engaging with a circular rack on top of post $n^3$, whereby said lever may be locked for holding the sliding jaw in place when the line of types has been compressed to the proper limit for justifying a line.

A gripping mechanism for leveling or dressing the line of type and firmly holding the line consists as follows: O is a fixed jaw secured to the bed or table in a line at one side of the assembled types and against which the types rest, the types having a shoulder which sets on the upper edge of said jaw. P is a movable jaw arranged opposite the said fixed jaw O. It has a slanting face, the lower edge of which engages with a nick in the edge of the types opposite to the said shoulder. When the types are gripped between these jaws, their faces are brought into perfect alignment and firmly held there. Said jaw is pivoted in slots in the bed, and its lower ends, which extend below the bed, are connected by a connecting-rod *p*, attached to a cross-bar and connecting it with a hand-lever Q, fulcrumed in a slot near the left-hand end of the table, by which said jaw is operated. Said lever Q is also provided with a pawl *q*, engaging with notches in a curved rack $q^2$, by which the jaw may be locked.

The mechanism for making the impression in the matrix is as follows: In the front part of the bed or table A is made a longitudinal opening, in which is placed a long narrow plate R, capable of being raised and lowered. It is provided at the ends with corner bearings, which slide in ways *r*, fitted therefor in the bed or table. Journaled in bearings *s s* on the under side of the table A is a short shaft S, one end of which extends out through the side of the bed or table, and is provided with a hand-lever T, by which said shaft is turned. Upon said shaft, between its bearings, is fixed a short lever or cam $T^2$, the moving end of which bears against a middle cross-rib *t* on the under side of the said plate R, located directly under the place of type assembly. In the upper face of said plate R is made a narrow longitudinal groove *u*. V is a galley for holding the matrices. It is the same width as the plate R and is provided with a longitudinal rib *v* on its under side, which fits and runs in the aforesaid longitudinal groove *u* in the plate R. This serves as a guide for the movement of the galley. Upon one edge of the galley-side is made a row of ratchet-teeth, in which a pawl *w*, attached to the movable jaw P, engages and serves to feed the galley along the bed or table.

The operations of this machine are as follows: The type are assembled and set together to spell and compose words by the operator manipulating the keys in like manner to that of the type-writer. When enough words are thus composed, using the aforesaid compressible spaces between the words to fully complete a line, the line is then justified by moving the jaw N forward, compressing the line to the required width of column. Next the line is gripped by bringing up the jaw P, which catches into the nicks of the types and forces the types against the fixed jaw O, bringing their shoulders down onto said jaw. The types are now in perfect position for making an impression, which is done by bearing down on the hand-lever T, thus forcing the plate R and the galley containing the matrix material upward against the said assembled types. When the impression is made, the types are released from the grip of the justifier N and vise or grip O P. Now, by taking hold of the handle Z on the front of the frame B, the frame and the mechanism supported by it are tilted over backward, as seen in dotted lines on Fig. 3. This causes all the types to run down back on their respective wires to their original places next to the arc or bow D, and then the frame is returned to its normal position, with the types all properly distributed and ready for repeating the operations just described. The arcs or bows H L are slightly raised from arc or bow D to let the types pass the latches by means of a rest or suitable pins upon which the said bow H strikes. This allows the bow D to move slightly in the slots *h* in bow H sufficient for the type to pass under the latches.

The matrix material may be made of papier-maché, and I prefer to prepare it in blocks of a size sufficient to receive the impression of one line only, and arrange them in galleys of, say, one column length, and made the impressions in said blocks in succession, feeding the galley along on the table line by line as the impressions are made by means of the pawl on the movable gripping-jaw P playing on the ratcheted edge of the galley.

Many of the errors that occur in the present method of type-setting cannot occur with this machine—such as letters turned upside down, the dropping out of a letter, or the pieing of a line. Errors may occur by the misspelling of a word or improper punctuation, &c., by the mistakes of the operator. Such errors I correct by taking out the imperfect block, insert a new one in its place, reset the line, and make an impression therefrom, thereby perfecting the galley very quickly and with very little trouble or expense.

The wires constitute ways on which the character members travel. The types constitutes character members. The portions of the ways on which the character members are suspended when assembled in a line of composition constitute assemblage portions. The portions of the ways on which the character members are suspended upon breaking up of such line, either while being distributed or after being distributed, constitute distributive portions.

Having described the construction and operation of my invention, what I claim, and desire to secure by Letters Patent, is—

1. The combination, with ways having assemblage portions collected together at different elevations in a common plane and having distributive portions respectively located in lines angular to said plane, of character members having travel on said ways and extending from the latter, so as to locate the characters in a common printing line, substantially as set forth.

2. The combination, with ways having assemblage portions respectively located in a plane one above another and having distributive portions respectively located out of said plane side by side, of character members having travel on said ways and extending from the latter, so as to locate the characters in a common printing line, substantially as set forth.

3. The combination, with ways having assemblage portions respectively located at different heights in a common plane and having distributive portions respectively located in different vertical planes angular to said common plane, of character members having travel on said ways and extending from the latter, so as to locate the characters in a common printing line, substantially as set forth.

4. The combination, with ways having assemblage portions located in the same vertical plane and having distributive portions respectively located in different vertical planes, of character members having travel on said ways and extending from the latter, so as to locate the characters in a common printing line, substantially as set forth.

5. The combination of suspended types with inclined wires, upon which the said types are traversed by gravity for assemblage and distribution, substantially as described.

6. As an improved form of compressible spaces, a shank of rubber obliquely perforated, having a hook or eye at top, by which it may be traversed on inclined wires by gravity for assemblage and distribution with the types, substantially as described.

7. The combination of types strung on inclined tram-wires, having their upper ends supported on an arc or bow and their lower ends concentrated and brought into two parallel vertical planes, whereby the types are assembled together for composing words and sentences, substantially as described.

8. The combination of types strung on inclined tram-wires whose upper ends are supported on an arc or bow and their lower ends concentrated and brought into two parallel vertical planes and supported by a vertical post, with a key-board mechanism, substantially as described, and with cords and latches attached to the bow, whereby said types are released one by one by the operations of said key-board and latch mechanism for the assemblage of the types, substantially as and for the purpose specified.

9. The combination, with an arc or bow, of the tram-wires having types strung thereon and arranged in inclined lines downward from said arc or bow in part of their lengths and having their lower portions concentrated and brought into horizontal lines and two vertical planes, whereby said types are traversed by gravity downward to said vertical planes for assemblage in the composition of words and sentences, substantially as described.

10. The combination, with the arcs or bows H L, of the keys and cords K and latches I, with the tram-wires E, having types G strung thereon, and the latch-plates I, pivoted to the bow H, and having lever-arm J, connected to cords K, leading to the key-board C, and provided with retracting-springs $j^2$, said latches having slots $i$, forming lips by which the types G are held and released one at a time by the movements of the keys through the medium of said latches, substantially as specified.

11. The combination, with table A, of a tilting frame B, supporting the inclined type-bearing tram-wires, whereby the inclination of said wires on said frame to the plane of the table may be reversed and the types caused to traverse the wires for distribution, substantially as described.

12. The combination, with the bed or table A, of the frame B, pivoted at rear side to ears or lugs $b$ and supporting the key-board C on posts $c$ $c$, the arcs D H L on posts $d$ $d$ and post F, said arcs and post F supporting inclined tram-wires E, on which the types G are strung, and the cords K, operating the latches I, whereby said frame and its accompanying mechanism may be tilted over backward for reversing the position of the tram-wires and cause the assembled types to run backward again for distribution, substantially as specified.

13. The combination, with the types assembled in the manner described, of the fixed jaw O and pivoted jaw P, attached to the table A and actuated by means of the connecting-rod $p$, connected to hand-lever Q, provided with pawl $q$ and curved rack $q^2$, whereby the line of assembled types is gripped and held in alignment, substantially as and for the purpose specified.

JOHN R. ROGERS.

Witnesses:
THOS. B. HALL,
J. B. FAY.